US012632417B2

(12) United States Patent
Vyas

(10) Patent No.: US 12,632,417 B2
(45) Date of Patent: May 19, 2026

(54) HADOOP DISTRIBUTED FILE SYSTEM (HDFS) EXPRESS BULK FILE DELETION

(71) Applicant: RAKUTEN SYMPHONY, INC., Tokyo (JP)

(72) Inventor: Aniruddh Vyas, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 54 days.

(21) Appl. No.: 18/006,874

(22) PCT Filed: Nov. 17, 2022

(86) PCT No.: PCT/US2022/050267

§ 371 (c)(1),
(2) Date: Jan. 26, 2023

(87) PCT Pub. No.: WO2024/107195

PCT Pub. Date: May 23, 2024

(65) Prior Publication Data

US 2024/0273065 A1     Aug. 15, 2024

(51) Int. Cl.
G06F 16/16     (2019.01)
G06F 16/182     (2019.01)

(52) U.S. Cl.
CPC .......... G06F 16/162 (2019.01); G06F 16/164 (2019.01); G06F 16/1824 (2019.01)

(58) Field of Classification Search
CPC ... G06F 16/162; G06F 16/164; G06F 16/1824
USPC ........................................................ 707/822
See application file for complete search history.

(56) References Cited

U.S. PATENT DOCUMENTS

| | | | | |
|---|---|---|---|---|
| 8,239,947 | B1 * | 8/2012 | Glick ...................... | G06F 21/52 |
| | | | | 713/153 |
| 2019/0057101 | A1 | 2/2019 | Esserlieu et al. | |
| 2019/0065510 | A1 | 2/2019 | Pradeep et al. | |
| 2020/0134043 | A1 | 4/2020 | Demoor et al. | |
| 2021/0109851 | A1 * | 4/2021 | Dong .................... | G06F 3/0611 |
| 2022/0222214 | A1 * | 7/2022 | Lakshman .......... | G06F 16/2471 |
| 2022/0342933 | A1 * | 10/2022 | Lydick ................ | G06F 16/2433 |
| 2023/0147552 | A1 * | 5/2023 | Mainali ................ | G06F 16/125 |

FOREIGN PATENT DOCUMENTS

| | | | | | |
|---|---|---|---|---|---|
| CN | 1606010 | A | * | 4/2005 | ........... G06F 16/125 |
| CN | 111258848 | A | * | 6/2020 | |
| CN | 112540968 | A | * | 3/2021 | |
| CN | 114586022 | A | * | 6/2022 | ......... G06F 16/2452 |

* cited by examiner

*Primary Examiner* — Usmaan Saeed
(74) *Attorney, Agent, or Firm* — HAUPTMAN HAM, LLP

(57)     ABSTRACT

Hadoop Distributed File System (HDFS) express bulk file deletion is described. A list of files in a Hadoop Distributed File System (HDFS) is generated in order of an associated date of files in the HDFS. A predetermined date for retaining selected files in the HDFS is received. A count of files in the list with the associated date of the files in the HDFS older than the predetermined date is identified. Files for deletion from the HDFS having the associated date older than the predetermined date are identified, a number of the files identified for deletion being equal to the count of files. The number of the files in the HDFS identified for deletion equal to the count of files are deleted.

21 Claims, 7 Drawing Sheets

Figure 3:
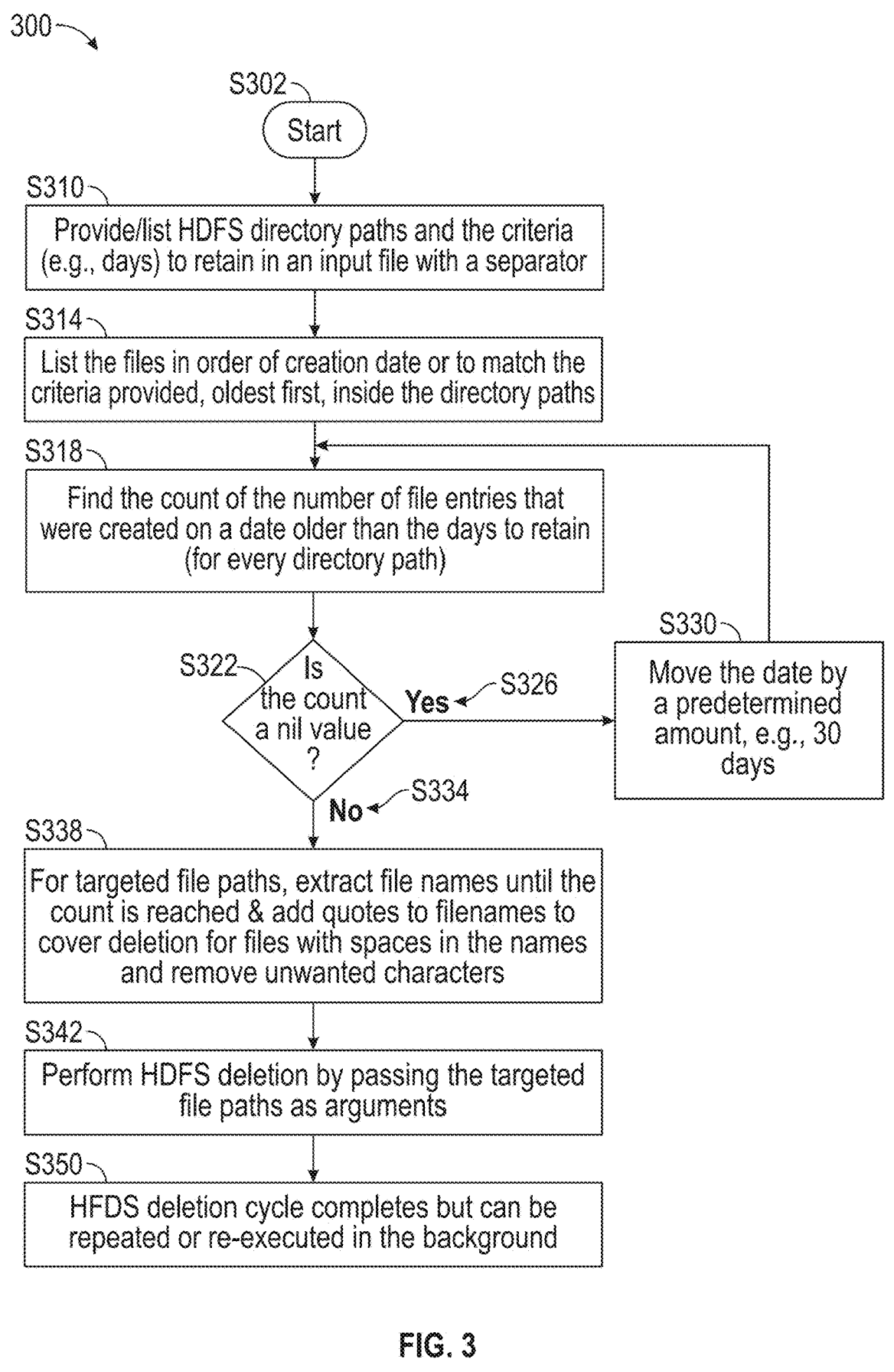

300

S302
Start

S310
Provide/list HDFS directory paths and the criteria (e.g., days) to retain in an input file with a separator S314
List the files in order of creation date or to match the criteria provided, oldest first, inside the directory paths S318
Find the count of the number of file entries that were created on a date older than the days to retain (for every directory path)

S322
Is the count a nil value?

S326 Yes

S330
Move the date by a predetermined amount, e.g., 30 days

S334 No

S338
For targeted file paths, extract file names until the count is reached & add quotes to filenames to cover deletion for files with spaces in the names and remove unwanted characters S342
Perform HDFS deletion by passing the targeted file paths as arguments S350
HFDS deletion cycle completes but can be repeated or re-executed in the background

Current_Date_Time    Days to Return 60 days    Lookback 90days    Count: 0
410 — 2022-03-01 08:00    412 — (12/31/2021, 08:00)    December 1, 2021    416
                                    414

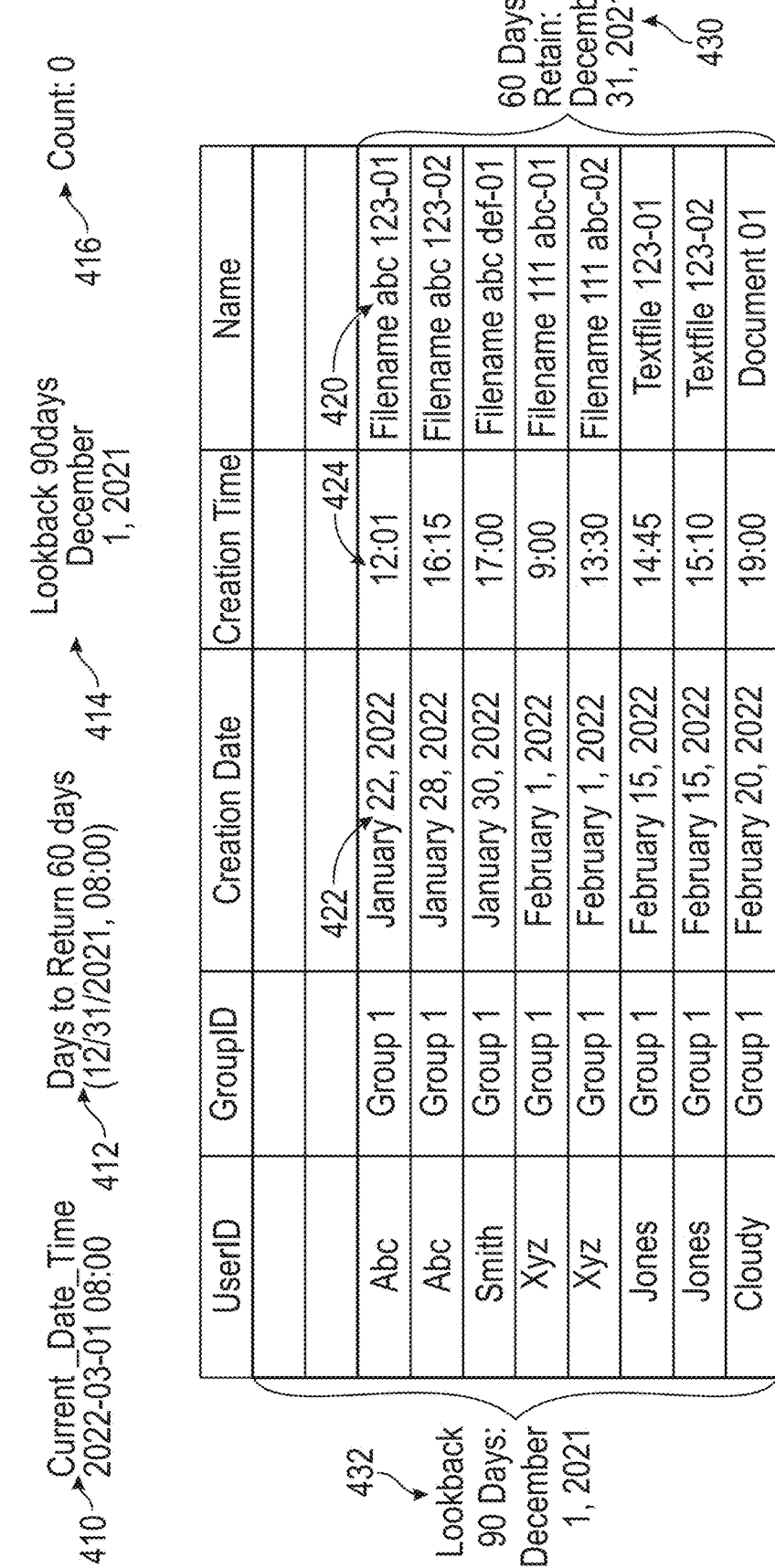

| UserID | GroupID | Creation Date | Creation Time | Name |
|--------|---------|---------------|---------------|------|
| | | 422 | 424 | 420 |
| Abc | Group 1 | January 22, 2022 | 12:01 | Filename abc 123-01 |
| Abc | Group 1 | January 28, 2022 | 16:15 | Filename abc 123-02 |
| Smith | Group 1 | January 30, 2022 | 17:00 | Filename abc def-01 |
| Xyz | Group 1 | February 1, 2022 | 9:00 | Filename 111 abc-01 |
| Xyz | Group 1 | February 1, 2022 | 13:30 | Filename 111 abc-02 |
| Jones | Group 1 | February 15, 2022 | 14:45 | Textfile 123-01 |
| Jones | Group 1 | February 15, 2022 | 15:10 | Textfile 123-02 |
| Cloudy | Group 1 | February 20, 2022 | 19:00 | Document 01 |

60 Days to Retain: December 31, 2021
430

432
Lookback 90 Days: December 1, 2021

FIG. 4

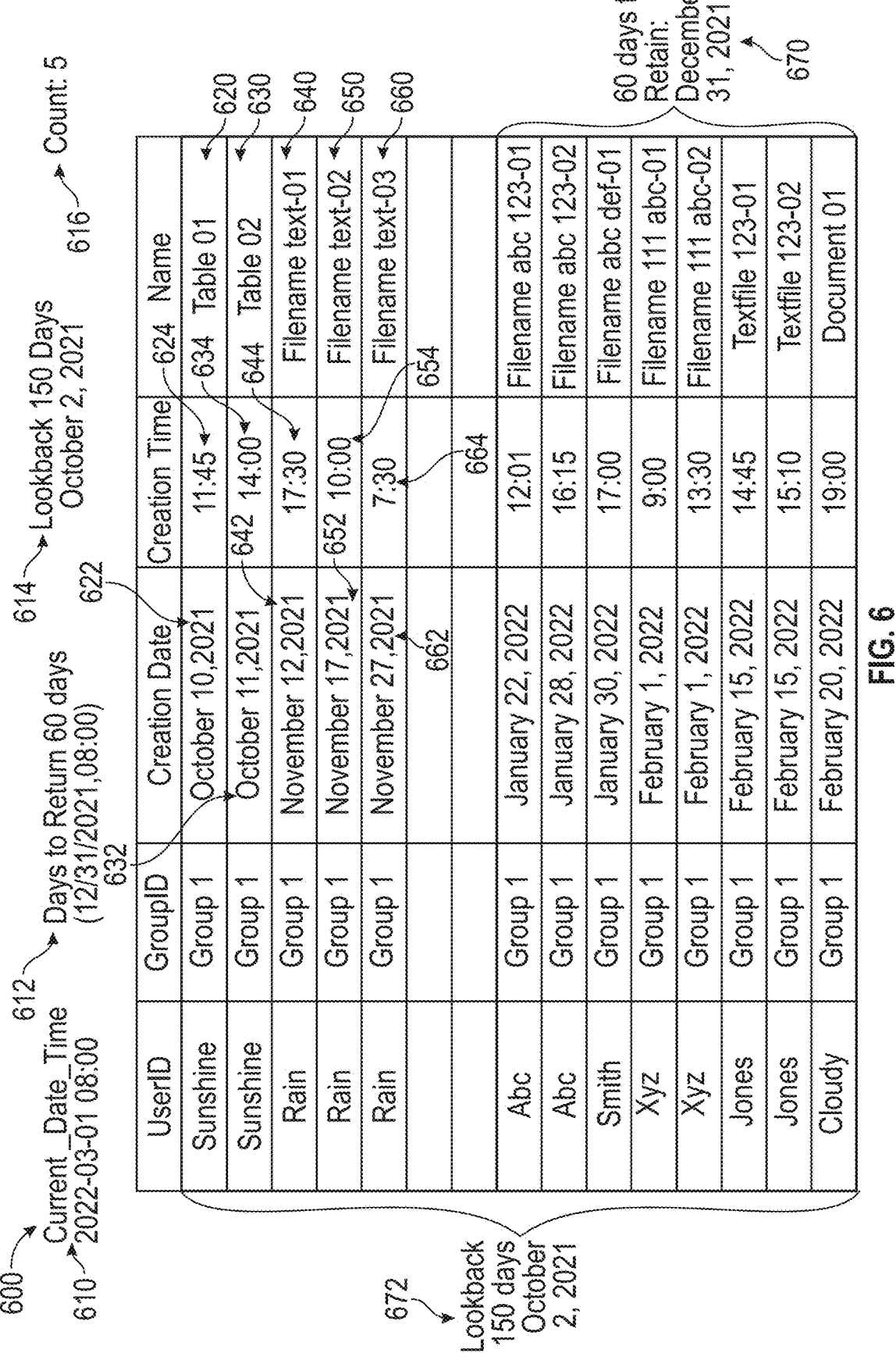

| UserID | GroupID | Creation Date | Creation Time | Name |
|---|---|---|---|---|
| Sunshine | Group 1 | October 10, 2021 | 11:45 | Table 01 |
| Sunshine | Group 1 | October 11, 2021 | 14:00 | Table 02 |
| Rain | Group 1 | November 12, 2021 | 17:30 | Filename text-01 |
| Rain | Group 1 | November 17, 2021 | 10:00 | Filename text-02 |
| Rain | Group 1 | November 27, 2021 | 7:30 | Filename text-03 |
| | | | | |
| Abc | Group 1 | January 22, 2022 | 12:01 | Filename abc 123-01 |
| Abc | Group 1 | January 28, 2022 | 16:15 | Filename abc 123-02 |
| Smith | Group 1 | January 30, 2022 | 17:00 | Filename abc def-01 |
| Xyz | Group 1 | February 1, 2022 | 9:00 | Filename 111 abc-01 |
| Xyz | Group 1 | February 1, 2022 | 13:30 | Filename 111 abc-02 |
| Jones | Group 1 | February 15, 2022 | 14:45 | Textfile 123-01 |
| Jones | Group 1 | February 15, 2022 | 15:10 | Textfile 123-02 |
| Cloudy | Group 1 | February 20, 2022 | 19:00 | Document 01 |

600
610 — Current_Date_Time 2022-03-01 08:00
612 — Days to Return 60 days (12/31/2021, 08:00)
614 — Lookback 150 Days October 2, 2021
616 — Count: 5
632
622
620
630
640
650
660
624 Name
634
644
652
654
662
664
670 — 60 days to Retain: December 31, 2021
672 — Lookback 150 days October 2, 2021

FIG. 6

HADOOP DISTRIBUTED FILE SYSTEM (HDFS) EXPRESS BULK FILE DELETION

RELATED APPLICATIONS

The present application is a National Phase of International Application No. PCT/US2022/050267, filed Nov. 17, 2022.

TECHNICAL FIELD

Embodiments described herein provide Hadoop Distributed File System (HDFS) express bulk file deletion.

BACKGROUND

HDFS (Hadoop Distributed File System) is a storage system used by Hadoop applications. HDFS is a distributed file system (DFS) that handles large data sets running on commodity hardware. HDFS is designed to store very large data sets reliably, and to stream those data sets at high bandwidth to user applications. In a large cluster, thousands of servers host directly attached storage and execute user application tasks. By distributing storage and computation across many servers, the resource are able to grow with demand while remaining economical at different sizes.

During use, HDFS performs basic operations of creating files, reading data from the files, and writing data to the files.

A HDFS directory begins to fill with a large number of files and directories. Because of the large number of directories and files, having sufficient storage space becomes an issue. In response to there being too many files in too many directories, file deletion is often performed.

There are HDFS commands to delete files and directories. Users want to retain fresher (or more recent) files, while older files are purged or deleted. During deletion operations, some of the targeted files include spaces in the names and are not identified and incorrect filenames are passed as arguments. For example, in response to using regular expressions to delete the files, the process is unable to parse the whole name. HDFS extracts only the first word or portion of that whole name and treats that parsed portion as a single file name. The truncated file names do not exist or involve files that are more recent. Thus, attempting to delete a file identified based on a portion of the file name causes an error to be generated because HDFS determines that such a file does not exist, or deletion of such files cause data loss.

Previous HDFS file deletion tools also do not provide a method to delete HFDS files in bulk. Manually reducing the files is very cumbersome, often relying on a customized script or single commands entered individually, e.g., deletion of files older than 60 days. Even in such cases, there is no regular expression or HDFS command that is usable to identify files older than a predetermined date, and the process is slow. Previous file deletion tools apply conditional checks so that older files are targeted and more recent files are retained. For example, to delete dates older than a predetermined date, the files in a directory are listed, the date for the files are extracted, the date of the files are compared with the predetermined date.

SUMMARY

In at least one embodiment, a method for performing bulk deletion of files in a Hadoop Distributed File System (HDFS) includes generating a list of files in a Hadoop Distributed File System (HDFS) in order of an associated date of files in the HDFS, receiving a predetermined date for retaining selected files in the HDFS, identifying a count of files in the list with the associated date of the files in the HDFS older than the predetermined date, identifying files for deletion from the HDFS having the associated date older than the predetermined date, a number of the files identified for deletion being equal to the count of files, and deleting the number of the files in the HDFS identified for deletion equal to the count of files.

In at least one embodiment, a device for performing bulk deletion of files in a Hadoop Distributed File System (HDFS), includes a memory storing computer-readable instructions, and a processor connected to the memory, wherein the processor is configured to execute the computer-readable instructions to generate a list of files in a Hadoop Distributed File System (HDFS) in order of an associated date of files in the HDFS, receive a predetermined date for retaining selected files in the HDFS, identify a count of files in the list with the associated date of the files in the HDFS older than the predetermined date, identify files for deletion from the HDFS having the associated date older than the predetermined date, a number of the files identified for deletion being equal to the count of files, and delete the number of the files in the HDFS identified for deletion equal to the count of files.

In at least one embodiment, a non-transitory computer-readable media having computer-readable instructions stored thereon, which when executed by a processor causes the processor to perform operations including generating a list of files in a Hadoop Distributed File System (HDFS) in order of an associated date of files in the HDFS, receiving a predetermined date for retaining selected files in the HDFS, identifying a count of files in the list with the associated date of the files in the HDFS older than the predetermined date, identifying files for deletion from the HDFS having the associated date older than the predetermined date, a number of the files identified for deletion being equal to the count of files, and deleting the number of the files in the HDFS identified for deletion equal to the count of files. includes

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIG. 3 is a flowchart of a method for performing Hadoop Distributed File System (HDFS) express bulk file deletion according to at least one embodiment.

FIG. 4 is a diagram of a list of files generated based on a 60 days to retain value and 90 days lookback according to at least one embodiment.

FIG. 6 is a diagram of a list of files generated based on a 60 days to retain value and 150 days lookback according to at least one embodiment.

DETAILED DESCRIPTION

Figure 1:
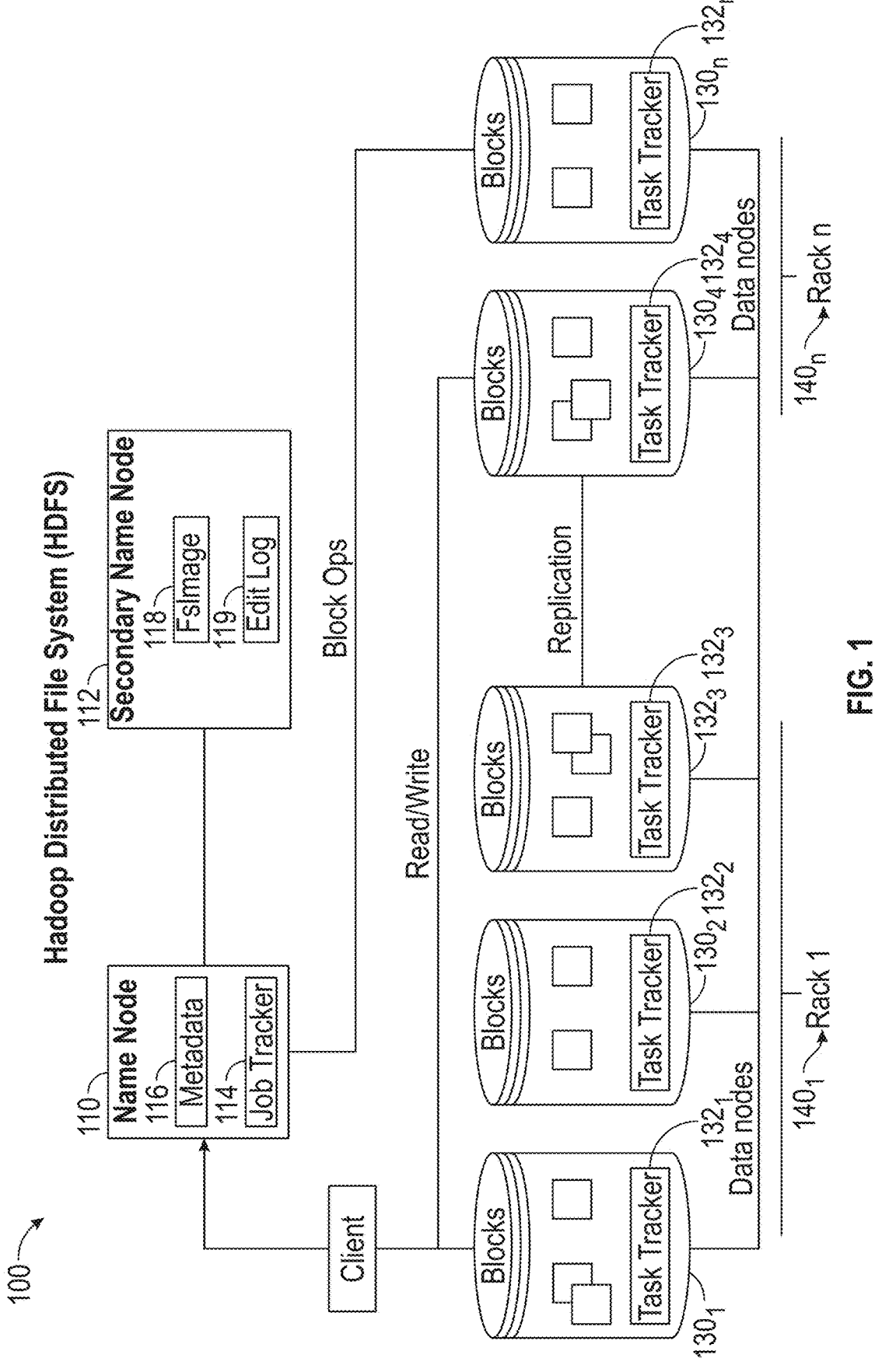
FIG. 1 is a diagram of a Hadoop Distributed File System (HDFS) architecture according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or a data-stream or signaling-stream. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, or a data-stream or signaling-stream from UE.

In at least one embodiment, a Hadoop Distributed File System (HDFS) express bulk file deletion method is used to provide fast deletion and allow multiple deletion jobs to be performed. A list of file names is generated with the latest (e.g., most recent) files listed last, and the dates associated with the files are extracted. A count of the files closest to a threshold value is determined, and based on the count, the number of files related to the count in an ascending order are deleted. The predetermined date is able to be decreased or made older iteratively until a count for files older than the predetermined date is determined. Text manipulation is used to provide arguments for extracting files from the ordered list of file names. Directories are able to be deleted in response to determining all files in a directory are older than the predetermined date that is provided as an argument to the process. The predetermined date is equally applicable to the date of directory creation. Additional files or directories are able to be deleted by re-running the script in the background. The file deletion process is accelerated compared to deleting files based on conditional checks.

In at least one embodiment, an HDFS system and method that implements the HDFS express bulk file deletion provides at least one of the following advantages: the determination of files to delete based on a count number that increases the rate of deletion of such files compared to using conditional checks, regular expression are able to identify file names based on the name manipulation to remove spaces in the file names. An increase in the number of deletion jobs means more operations and receding deadlines, more availability and therefore more revenue with overall time savings. The deletion of older files and directories result in more efficient performance of datanodes and namenodes.

FIG. 1 is a diagram of a Hadoop Distributed File System (HDFS) architecture 100 according to at least one embodiment.

In FIG. 1, Hadoop Distributed File System (HDFS) architecture 100 uses an HDFS to provide access to data across Hadoop clusters. A Hadoop cluster is a group of computers that work together. Like other Hadoop-related technologies, HDFS manages and supports analysis of very large volumes of data across the Hadoop clusters.

Hadoop clusters include a network of master and worker nodes that orchestrate and execute the various jobs across the HDFS architecture 100. Master nodes include a Namenode 110, Secondary Namenode 112, and Job Tracker (or Resource Manager) 114.

Worker nodes include virtual machines, running Datanodes $130_{1-n}$ and services of Task Trackers $132_{1-n}$ (or Node Manager). Datanodes $130_{1-n}$ and the Task Trackers $132_{1-n}$ store and process jobs as directed by the master nodes. Clients 120 are responsible for loading the data and fetching the results. Datanodes $130_{1-n}$ are arranged in $Racks_{1-n}$ $140_{1-n}$.

Namenode 110 manages the file system namespace and controls Client 120 access to files. Namenode 110 maintains and manages the Datanodes $130_{1-n}$. Namenode 110 regularly receives a heartbeat signal and a block report from the Datanodes $130_{1-n}$ in the cluster to help ensure that the Datanodes $130_{1-n}$ have not failed. In case of failure of one of the Datanodes $130_{1-n}$, Namenode 110 chooses a new datanode form Datanodes $130_{1-n}$ for new replicas, balance disk usage and manages the communication traffic to the Datanodes $130_{1-n}$. Namenode 110 maintains a directory tree of files in the HDFS 100 and tracks where the file is kept across the Datanodes $130_{1-n}$. Namenode 110 stores Metadata 116 of the files stored in HDFS, e.g., the location of blocks stored, the size of the files, permissions, hierarchy, etc. Namenode 110 also maintains an FsImage file 118 and an Edit Log file 119. FsImage 118 includes the state of the file system namespace since the start of the Namenode 110. Edit Logs 119 include the recent modifications made to the HDFS with respect to the most recent FsImage 118. Secondary Namenode 112 reads the file systems and Metadata 116 from Namenode 110 and writes it into storage of the HDFS. The Secondary Namenode 112 is responsible for combining the Edit Logs 119 with FsImage 118 from the Namenode 110.

Datanodes $130_{1-n}$ manages and stores data in the HDFS 100. HDFS includes numerous Datanodes $130_{1-n}$ with data distributed across the Datanodes $130_{1-n}$. Data in Datanodes $130_{1-n}$ is stored in the form of HDFS blocks. Datanodes $130_{1-n}$ connect to Namenode 110 and establishes the service. Then Data Node responds to requests from the Namenode 110 for file system operations. Data Nodes store and retrieve blocks, report to Namenode 110. Client 120 is able to talk directly to Datanodes $130_{1-n}$ by using the location of data provided by Namenode 110. Instances of Task Trackers $132_{1-n}$ are deployed on the same servers that host instances of Datanodes $130_{1-n}$. Client 120 accesses the file system on behalf of the user by communicating with Datanodes $130_{1-n}$.

Task Trackers $132_{1-n}$ accept tasks from a Job Tracker 114 and run the tasks on at least one of Datannode $130_{1-n}$. Job Tracker 114 passes the information to the Task Trackers $132_{1-n}$ and Task Trackers $132_{1-n}$ run the job on Datanodes $130_{1-n}$. Task Trackers $132_{1-n}$ monitor task instances, and capture the output and exit codes. When the task instances finish, successfully or not, Task Trackers $132_{1-n}$ notify the Job Tracker 114. The Task Trackers $132_{1-n}$ also send out periodic heartbeat messages to the Job Tracker 114 to let the Job Tracker 114 know that Task Trackers $132_{1-n}$ have not failed.

Job Tracker 114 is a service, often provided by Namenode 110, and farms out tasks to specific nodes in the cluster. In some embodiments, the Job Tracker 114 farms out tasks to nodes that have the data, or at least nodes that are in the same rack. Job Tracker 114 is responsible for scheduling and rescheduling tasks to Datanodes $130_{1-n}$ running Task Trackers $132_{1-n}$. Job Tracker 114 obtains responses and acknowledgements from Task Trackers $132_{1-n}$ of the Datanodes $130_{1-n}$. Clients 120 submit jobs to the Job Tracker 114 of Namenode 110, wherein Job Tracker 114 determine the data location. The Job Tracker 114 locates Task Trackers $132_{1-n}$ with available slots at or near the data. The Job Tracker 114 submits the work to the chosen Task Trackers $132_{1-n}$. When the work is completed, the Job Tracker 114 updates its status.

HDFS 100 exposes a file system namespace and enables user data to be stored in files. A file is split into one or more of the blocks that are stored in Datanodes $130_{1-n}$. Datanodes $130_{1-n}$ serve read and write requests from Clients 120 of the file system. In addition, Datanodes $130_{1-n}$ perform block creation, deletion and replication when the Namenode 110 instructs Datanodes $130_{1-n}$ to perform such operations. Data replication is used to ensure that the data is available and prevents data loss. For example, when a node crashes or there is a hardware failure, replicated data can be pulled from elsewhere within a cluster, so processing continues while data is recovered.

According to at least one embodiment, HDFS 100 implements an HDFS express bulk file deletion that generates a list of files with the oldest files listed first. Express bulk file deletion provides a faster process than the previous deletion process that is based on a comparison process. A count of the files closest to a threshold value is determined, and based on the count, the number of files related to the count in an ascending order are deleted. The predetermined date is able to be increased iteratively until a count for files older than the predetermined date is determined. Text manipulation is used to provide arguments for extracting files from the ordered list of file names. Directories are able to be deleted in response to determining all files in a directory are older than the predetermined date that is provided as an argument to the process. The predetermined date is equally applicable to the date of directory creation. Additional files or directories are able to be deleted by re-running the script in the background. The file deletion process is accelerated compared to deleting files based on conditional checks. Performing conditional checks involves a comparison process that takes a lot of time. In response to using an "if, then" condition, the identification of files to delete and the deletion of the identified files is very slow. Furthermore, this technique is cumbersome and complex. Using a manual process is slow and more files are able to be created than deleted by a manual process. Accordingly, attempts to write scripts using native HDFS command to delete files have not solved the problems described above, e.g., the slow rate of deleting files, how to delete multiple files, how to deal with file naming issues when identifying files to delete. The HDFS express bulk file deletion method according to at least one embodiment provides fast deletion and allow multiple deletion jobs to be performed.

Figure 2:
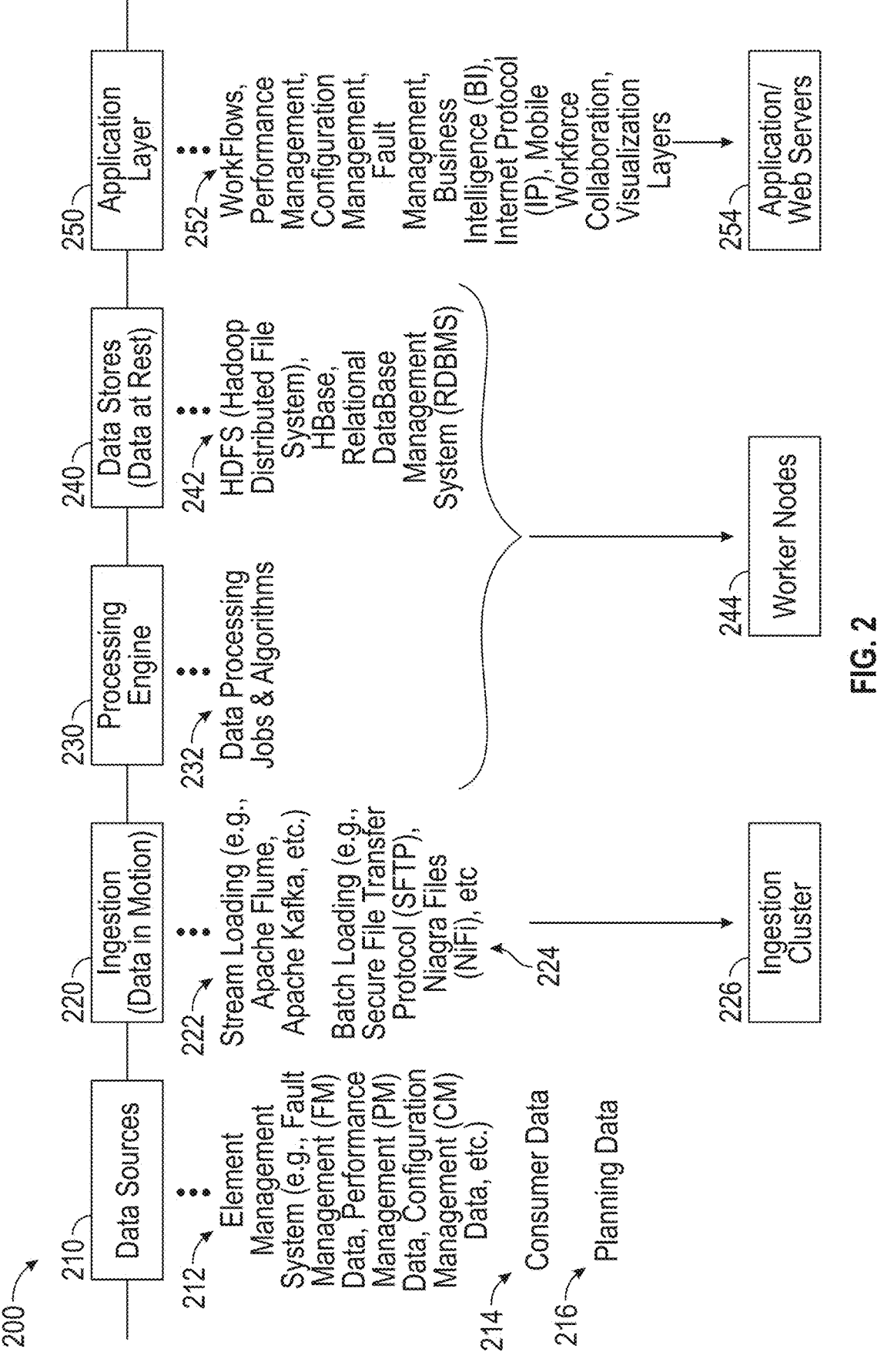
FIG. 2 is a system flow in an Operations Support Systems (OSS) according to at least one embodiment.

FIG. 2 is a system flow in an Operations Support Systems (OSS) 200 according to at least one embodiment.

In FIG. 2, Data Sources 210 are the sources of 2G/LTE or 5G/NR data as well as mobile core network elements data. Data Sources 210 of 2G/LTE or 5G/NR data include eNodeBs (LTE), gNodeBs (NR) and mobility management entities (MMEs). Other data sources are available depending on the architecture. As part of Data Sources 210, an Element Management System (EMS) 212 manages specific types of network elements. The EMS within a network element is used to manage functions and capabilities of the network element. Data Sources 210 also include Consumer Data 214 and Planning Data 216.

Ingestion 220 involves the transfer of data from Data Sources 210 to Ingestion Cluster 226. Ingestion Cluster 226 is configured as one or more servers. Ingestion 220 loads data through Stream Loading 222 or Batch Loading 224. In Stream Loading 222 the data is ingested into applications as soon as the data is generated. Stream Loading 222 of data is used in cases where the goal is to provide insights as fast as possible. Stream Loading 222 involves loading data as-is (without manipulation). In Batch Loading 224, data is provided to queues at regularly scheduled intervals, where the data is then loaded into applications. Batch Loading 224 is useful for obtaining data from processes that run on a schedule, such as reports that run daily at a specific time.

Processing Engine 230 is used to analyze data from Ingestion 220. Processing Engine 230 applies Data Processing Jobs and Algorithms 232 to the data. Processing Engine 230 uses the Data Processing Jobs and Algorithms 232 to organize, configure, and partition the data.

Data Stores 240 provide persistent storage and management for collections of data that include repositories such as databases and files. Different datastores are able to be used, such as Hadoop Distributed File System (HDFS), HBase, and Relational Database Management System (RDBMS) 242. As described above, HDFS is a distributed, scalable, and portable file system used by Hadoop applications to manage large amounts of data and support related big data analytics applications. Big data refers to a combination of structured, semi-structured and unstructured data that is ingested and that is able to be mined for information, used in machine learning projects, predictive modeling and other advanced analytics applications. HBase is the Hadoop database that provides a distributed, scalable, big data store. HBase is a column-oriented non-relational database management system that runs on top of HDFS. RDBMS stores data in a row-based table structure that connects related data elements.

Processing Engine 230 and Data Stores 240 are supported by Worker Nodes 244. Worker Nodes 244 are used to run applications and handle networking to help ensure that traffic between applications are facilitated as designed. Worker Nodes 244 are able to be implemented as a virtual machine, a physical machine, or a combination.

Application Layer 250 provides various kinds of services, including User Management, Index Management, and Resource Management. Application Layer 250 is configured to provide application services to support WorkFlows, Performance Management, Configuration Management, Fault Management, Business Intelligence (BI), Internet Protocol (IP), Mobile Workforce Collaboration, and Visualization Layers 252. Application Layer 250 is implemented using Application/Web Servers 254.

HDFS 242 implements HDFS express bulk file deletion according to at least one embodiment. A list of files is generated with the oldest files listed first. A count of the files closest to a threshold value is determined, and based on the count, the number of files related to the count in an ascending order are deleted. The predetermined date is able to be increased iteratively until a count for files older than the predetermined date is determined. Text manipulation is used to provide arguments for extracting files from the ordered list of file names. Directories are able to be deleted in response to determining all files in a directory are older than the predetermined date that is provided as an argument to the process. The predetermined date is equally applicable to the date of directory creation. Additional files or directories are able to be deleted by re-running the script in the background. The file deletion process is accelerated compared to deleting files based on conditional checks. Performing conditional checks involves a comparison process that takes a lot of time. In response to using an "if, then" condition, the identification of files to delete and the deletion of the identified files is very slow. Furthermore, this technique is cumbersome and complex. Using a manual process is slow and more files are able to be created than deleted by a manual process. Accordingly, attempts to write scripts using native HDFS command to delete files have not solved the problems described above, e.g., the slow rate of deleting files, how to delete multiple files, how to deal with file naming issues when identifying files to delete. The HDFS express bulk file deletion method according to at least one embodiment provides fast deletion and allow multiple deletion jobs to be performed.

FIG. 3 is a flowchart 300 of a method for performing Hadoop Distributed File System (HDFS) express bulk file deletion according to at least one embodiment.

In FIG. 3, the HDFS express bulk file deletion process begins S302 and HDFS directory paths and the criteria (e.g., days) to retain in an input file with a separator are provided S310.

The files are listed in order of creation date or to match the criteria provided, oldest first, inside the directory paths S314. The list of file names is generated by searching files the HDFS and the dates associated with the files are extracted. Instead of using conditional checks to compare the creation or modification date of files with a predetermined date, a count of the files closest to the threshold value is determined. For example, the files names are listed with the oldest files listed first. The most recent file is listed last. Performing conditional checks involves a comparison process that takes a lot of time. In response to using an "if, then" condition, the identification of files to delete and the deletion of the identified files is very slow. Furthermore, this technique is cumbersome and complex. Using a manual process is slow and more files are able to be created than deleted by a manual process. Accordingly, attempts to write scripts using native HDFS command to delete files have not solved the problems described above, e.g., the slow rate of deleting files, how to delete multiple files, how to deal with file naming issues when identifying files to delete. The HDFS express bulk file deletion method according to at least one embodiment provides fast deletion and allow multiple deletion jobs to be performed.

The count of the number of file entries that were created on a date older than the days to retain (for directory path) is determined S318. A file count from an ordered list is used to determine the last occurrence of given date in the date column thereby avoiding time consuming steps. Thus, the HDFS express bulk file deletion does not compare the dates of files with the threshold. A file having a date that is closest to the predetermined date provided as a threshold is identified and the count of files is determined.

A determination is made regarding whether the count has a nil value, e.g., whether the number of files older than the days to retain is equal to zero S322. The count value is used to delete a number of files that equal the count. Based on the count, HDFS deletes the number of files related to the count in an ascending order. By not comparing dates, the rate for the deletion of files is increased.

In response to the count being equal to zero S326, the "days to retain" is moved by a predetermined amount, e.g., 30 days, to attempt to reach a count that is not equal to zero S330. The count of the number of file entries that were created on a date older than the revised days to retain is again determined S318. This process is able to be repeated iteratively until the number of files older than the days to retain is greater than zero S334. Alternatively, in some embodiments, the count is set to a predetermined number and the process is able to be repeated until the count is greater than or equal to the predetermined number of files. Finding a count in an ordered list takes $O(\log_2 n)$ time compared to $O(n)$ time in other methods with conditional checks.

In response to the count being greater than zero S334, file names for targeted file paths are extracted until the count is reached and quotes are added to filenames to cover deletion for files with spaces in the names and to remove unwanted characters S338. Text manipulation is used to provide arguments for extracting files from the ordered list of file names. For example, in at least one embodiment, text manipulations provide arguments for executing a "rm command" for files including the ones with spaces in their names. The "rm command" is used for removing a file from the HDFS system. File names that are obtained are able to be stored in a file which provides input to "rm commands" to execute the deletion once without re-entering the "rm command." Bulk deletion is provided for filenames that have spaces in their names. Accordingly, bulk deletion is provided without adding processing time, without renaming the files, and without generating errors due to erroneous file names.

HDFS deletion is performed by passing the targeted file paths as arguments S342. HDFS deletion according to at least one embodiment is able to be implemented as a native command. The user only has to provide the date as an argument. Scripts are not run on multiple servers, and java code or classes are not tweaked. No additional tool or software is used. Where regular expressions or wild cards fail, some embodiments described herein provide the fastest solution for deletion of files in HDFS in many scenarios, whether timestamp based or generic.

HDFS express bulk file deletion also works for directories. Directories are able to be deleted in response to determining all files in a directory are older than the predetermined date that is provided as an argument to the process. The predetermined date is equally applicable to the date of directory creation. Additional files or directories are able to be deleted by re-running the script in the background. The files identified for deletion are able to be deleted permanently, or the files identified for deletion are able to be stored, e.g., in a recycle bin. The files in the recycle bin are able to be kept for a predetermined time before deleting the files permanently.

The HFDS deletion cycle completes, but is repeatable or able to be re-executed in the background S350.

FIG. 4 is a diagram of a list of files generated based on a 60 days to retain value and 90 days lookback 400 according to at least one embodiment.

In FIG. 4, the current date and time 410 is shown as being "Mar. 1, 2022, 08:00." The days to retain 412 is shown as being "60 days" with the cutoff date and time being "Dec. 31, 2021, 08:00". A lookback of 90 days 414 is used with a cutoff date of Dec. 1, 2021.

The oldest file, having a file name of filename abc 123-01 420, is shown have a creation date of "Jan. 22, 2022" 422 and a creation time of "12:01" 424. Within the 60 days to retain: Dec. 31, 2021 window 430 are 8 files. No files older than the 60 days to retain window 430 are in the Lookback window 432. Accordingly, the count of files older than the days to retain 412 of "60 days", i.e., older than "Dec. 31, 2021, 08:00" and within the 90 day Lookback window 432 is zero (0) 416. The oldest file, having a file name of filename abc 123-01 420, is 79 days old.

The HDFS express bulk file deletion process thus does not delete any files and the days to lookback 414 is moved by a predetermined amount, e.g., 30 days.

Figure 5:
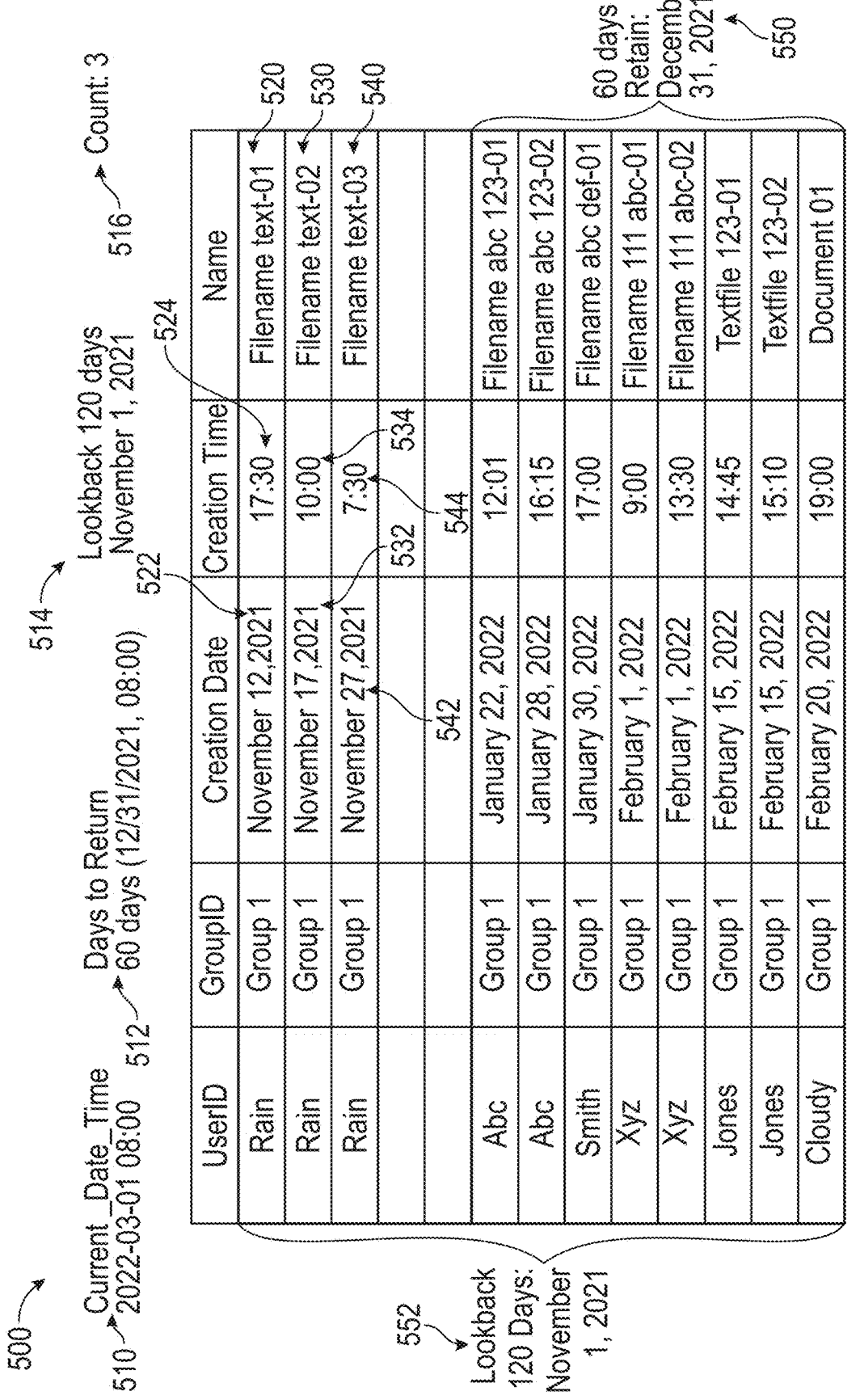
FIG. 5 is a diagram of a list of files generated based on a 60 days to retain value and a 120 days lookback according to at least one embodiment.

FIG. 5 is a diagram of a list of files generated based on a 60 days to retain value and a 120 days lookback 500 according to at least one embodiment.

In FIG. 5, the current date and time 510 is shown as being "Mar. 1, 2022, 08:00." The days to retain 512 is shown as being "60 days" with the cutoff date and time being "Dec. 31, 2021, 08:00". A lookback of 120 days 514 is used with a cutoff date of Nov. 1, 2021.

The oldest file, having a name of filename text-01 520 is 109 days old, and is shown have a creation date of "Nov. 12, 2021" 522 and a creation time of "17:30" 524.

File having a file name of filename text-02 530 has a creation date of "Nov. 17, 2021" 532 and a creation time of "10:00" 534. Thus, the file having a file name of filename text-02 530 is older than 60 days, i.e., 104 days. File having a file name of filename text-03 540 has a creation date of "Nov. 27, 2021" 542 and a creation time of "7:30" 544. Accordingly, the file having a file name of filename text-03 540 is 94 days old.

Within the 60 days to retain window 550 are 8 files. There are 3 files older than the 60 days to retain window 550 and within the 120 days lookback window 552. Accordingly, the count of files older than the days to retain 512 of "60 days", i.e., older than "Dec. 31, 2021, 08:00" and within the 120 day Lookback window 552 is three (3) 516.

The HDFS express bulk file deletion process deletes the oldest 3 files 520, 530, 540. Further, as arguments for the delete operation, quotes are added to filenames to cover deletion for files with spaces in the names and to remove unwanted characters as described above with reference to S338 of FIG. 3. Text manipulations provide arguments for executing a "rm command" for files including the ones with spaces in their names. The "rm command" is used for removing a file from the HDFS system. File names that are obtained are able to be stored in a file which provides input to "rm commands" to execute the deletion once without re-entering the "rm command." Bulk deletion is provided for filenames that have spaces in their names. Accordingly, bulk deletion is provided without adding processing time, without renaming the files, and without generating errors due to erroneous file names. Thus, the names provided as arguments to the delete operation are "filename text-01", filename text-02", and filename text-03".

While the example described with reference to FIG. 5 involves the deletion of files, directories are also able to be deleted in response to determining all files in a directory are older than the predetermined date that is provided as an argument to the process. The predetermined date is equally applicable to the date of directory creation. In addition, while the example described with reference to FIG. 5 involves the deletion of files based on a creation date and time, other criteria are able to be used, e.g., date and time of modification, last accessed date and time, etc.

FIG. 6 is a diagram of a list of files generated based on a 60 days to retain value and 150 days lookback 600 according to at least one embodiment.

The list 600 shown in FIG. 6 is provided as another example. Because the count in FIG. 5 was greater than zero, i.e., 3, the days to retain does not change. In other words, once the count is obtained, the files from oldest till the count are deleted, and hence more files are not captured. This process of changing the date by a predetermined amount as described above with reference to S330 is automatic according to at least one embodiment. However, in at least one embodiment, the process of changing the date by a predetermined amount as described above with reference to S330 is able to manually set by the user.

In FIG. 6, the current date and time 610 is shown as being "Mar. 1, 2022, 08:00." The days to retain 612 is shown as being "60 days" with the cutoff date and time being "Dec. 31, 2021, 08:00". In FIG, 6, the Lookback is 150 days 614.

File having a file name of table 01 620 has a creation date of Oct. 10, 2021 622 and a creatin time of 11:45 624. Thus, table 01 620 is older than 60 days, 142 days. File having a file name of table 02 630 has a creation date of Oct. 11, 2021 632 and a creatin time of 14:00 634. Thus, table 02 630 is older than 60 days, 141 days.

File having a file name of filename text-01 640 has a creation date of Nov. 12, 2021 642 and a creatin time of 17:30 644. Thus, filename text-01 640 is older than 60 days, 109 days. File having a file name of filename text-02 650 has a creation date of Nov. 17, 2021 652 and a creatin time of 10:00 654. Thus, filename text-02 650 is older than 60 days, 104 days. File having a file name of filename text-03 660 has a creation date of Nov. 27, 2021 662 and a creatin time of 7:30 664. Thus, filename text-03 660 is older than 60 days, 94 days.

Within the 60 days to retain window 670 are 8 files. There are 5 files older than the 60 days to retain window 670 and within the 150 days lookback window 672. Accordingly, the count of files older than the days to retain 612 of "60 days", i.e., older than "Dec. 31, 2021, 08:00" and within the 150 day Lookback window 672 is five (5) 616.

The HDFS express bulk file deletion process deletes the oldest 5 files 620, 630, 640, 650, 660. Further, as arguments for the delete operation, quotes are added to filenames to cover deletion for files with spaces in the names and to remove unwanted characters as described above with reference to S338 of FIG. 3. Text manipulations provide arguments for executing a "rm command" for files including the ones with spaces in their names. The "rm command" is used for removing a file from the HDFS system. File names that are obtained are able to be stored in a file which provides input to "rm commands" to execute the deletion once without re-entering the "rm command." Bulk deletion is provided for filenames that have spaces in their names. Accordingly, bulk deletion is provided without adding processing time, without renaming the files, and without generating errors due to erroneous file names. Thus, the names provided as arguments to the delete operation are "table 01", "table 02", "filename text-01", filename text-02", and "filename text-03."

While the example described with reference to FIG. 6 involves the deletion of files, directories are also able to be deleted in response to determining all files in a directory are older than the predetermined date that is provided as an argument to the process. The predetermined date is equally applicable to the date of directory creation. In addition, while the example described with reference to FIG. 6 involves the deletion of files based on a creation date and time, other criteria are able to be used, e.g., date and time of modification, last accessed date and time, etc.

While the examples in FIGS. 4-6 are presented using a current date and time of Mar. 1, 2022, 08:00, and a days to retain of 60 days, those skilled in the art understand that the current date and time, and the days to retain are capable of being different depending on circumstances and goals of users.

Thus, in at least one embodiment, a list of file names is generated and the dates associated with the files are extracted. Instead of using conditional checks to compare the creation or modification date of files with a predetermined date, a count of the files closest to the threshold value is determined. For example, the files names are listed with the oldest files listed first. The most recent file is listed last. A file count from an ordered list is used to determine the last occurrence of given date in the date column thereby avoiding time consuming steps. Thus, the HDFS express bulk file deletion does not compare the dates of files with the threshold. The HDFS express bulk file deletion uses that count value, and deletes that many files by determining a file with the last occurrence of the predetermined date. A file having a date that is closest to the predetermined date provided as a threshold is identified and a count of files is determined. Based on the count, HDFS deletes the number of files related to the count in an ascending order. By not comparing dates, the rate for the deletion of files is increased. The predetermined date for determining the count is increased iteratively by a predetermined amount, e.g., 30 days, 60 days, etc., until a count for files older than the days to retain and within the predetermined date is determined. Finding count in an ordered list takes $O(\log_2 n)$ time compared to $O(n)$ time in previous file deletion tools that use conditional checks.

Text manipulation is used to provide arguments for extracting files from the ordered list of file names. The HDFS express bulk file deletion according to at least one embodiment adds quotations on those file names, e.g., file names that have a space in its name. HDFS express bulk file deletion also works for directories. Directories are able to be deleted in response to determining all files in a directory are older than the days to retain and within the predetermined date that is provided as an argument to the process. The predetermined date is equally applicable to the date of directory creation. Additional files or directories are able to be deleted by re-running the script in the background. The files identified for deletion are able to be deleted permanently, or the files identified for deletion are able to be stored, e.g., in a recycle bin. The files in the recycle bin are able to be kept for a predetermined time before deleting the files permanently.

Figure 7:
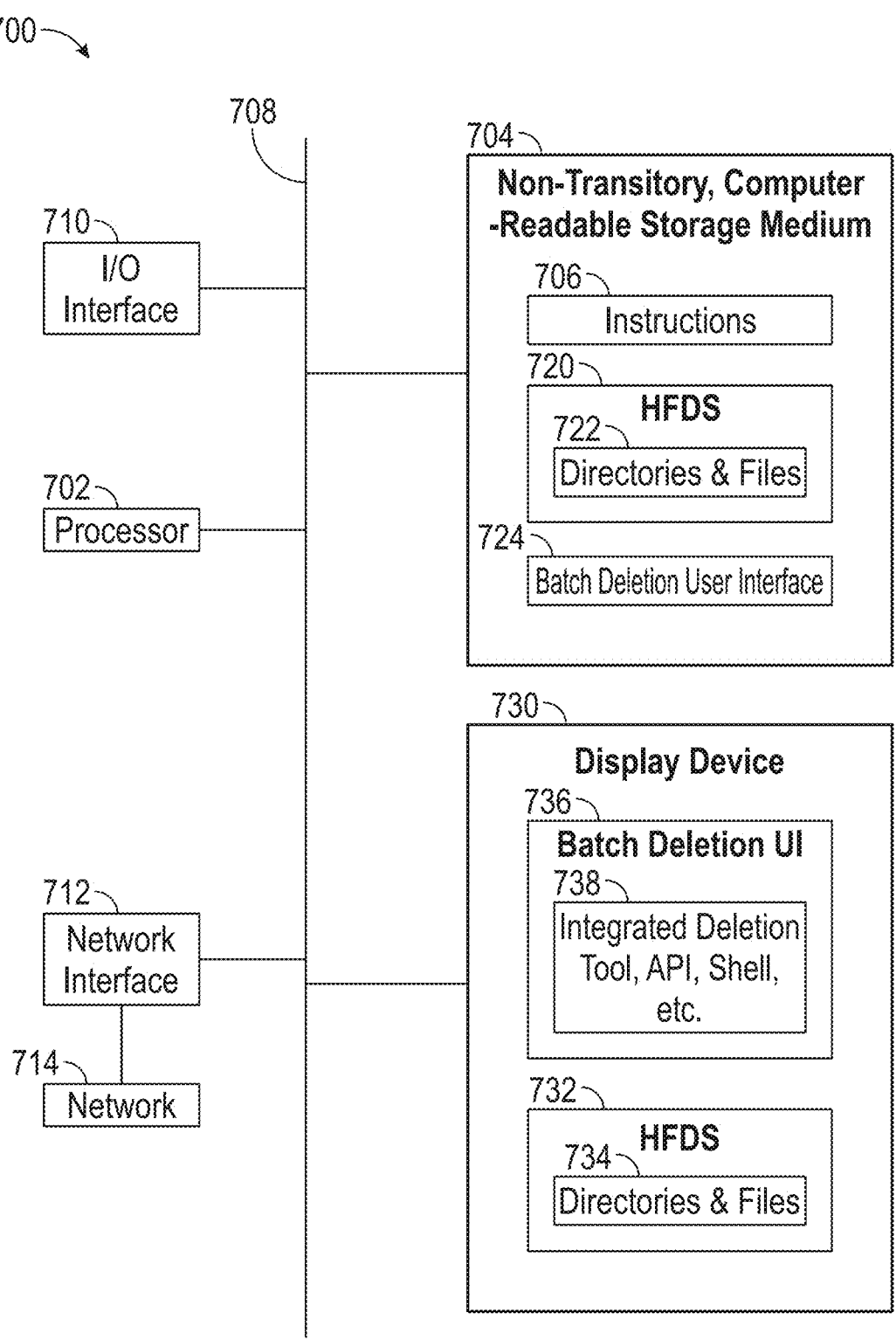
FIG. 7 is a high-level functional block diagram of a processor-based system according to at least one embodiment.

FIG. 7 is a high-level functional block diagram of a processor-based system 700 according to at least one embodiment.

In at least one embodiment, processing circuitry 700 implements Hadoop Distributed File System (HDFS)

express bulk file deletion according to at least one embodiment using processor 702. Processing circuitry 500 also includes a non-transitory, computer-readable storage medium 704 that is used to implement HDFS express bulk file deletion according to at least one embodiment. Storage medium 704, amongst other things, is encoded with, i.e., stores, instructions 706, i.e., computer program code that are executed by processor 702 causes processor 702 to perform operations for HDFS express bulk file deletion according to at least one embodiment. Execution of instructions 706 by processor 702 represents (at least in part) an application which implements at least a portion of the methods described herein in accordance with one or more embodiments (hereinafter, the noted processes and/or methods).

In one or more embodiments, one or more non-transitory computer-readable storage media 704 having stored thereon instructions (in compressed or uncompressed form) that may be used to program a computer, processor, or other electronic device) to perform processes or methods described herein. The one or more non-transitory computer-readable storage media 704 include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more non-transitory computer-readable storage media 704 includes a Compact Disk-Read Only Memory (CD-ROM), a Compact Disk-Read/Write (CD-R/W), and/or a Digital Video Disc (DVD).

Computer-readable storage medium 704 maintains Hadoop Distributed File System (HDFS) 720 including directories and files 722. While HDFS 720 including directories and files 722 is shown as being maintained on Computer-Readable Storage Medium 704 of processor-based system 700, those skilled in the art recognize that Computer-Readable Storage Medium 704 is also capable of being implemented over many devices in a distributed manner because an HDFS is implemented using a network of many computers/servers. Computer-readable storage medium 704 also maintains instructions for implementing HDFS express bulk file deletion according to at least one embodiment.

A Batch Deletion User Interface (UI) 724. Processor 702 is electrically coupled to computer-readable storage medium 704 via a bus 708. Processor 702 is electrically coupled to an Input/output (I/O) interface 710 by bus 708. A network interface 712 is also electrically connected to processor 702 via bus 708. Network interface 712 is connected to a network 714, so that processor 702 and computer-readable storage medium 704 connect to external elements via network 714. Processor 702 is configured to execute instructions 706 encoded in computer-readable storage medium 704 to cause processing circuitry 700 to be usable for performing at least a portion of the processes and/or methods. In one or more embodiments, processor 702 is a Central Processing Unit (CPU), a multi-processor, a distributed processing system, an Application Specific Integrated Circuit (ASIC), and/or a suitable processing unit.

Processing circuitry 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

Processing circuitry 700 also includes network interface 712 coupled to processor 702. Network interface 712 allows processing circuitry 700 to communicate with network 714, to which one or more other computer systems are connected. Network interface 712 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 700 is configured to receive information through I/O interface 710. The information received through I/O interface 710 includes one or more of instructions, data, design rules, libraries of cells, and/or other parameters for processing by processor 702. The information is transferred to processor 702 via bus 708. Processor 702 is configured to receive information through I/O interface 710 to present information associated with HFDS 732 including listings of Directories and Files 734.

Display Device 730 also presents Batch Deletion UI 736 that supports HDFS bulk deletion according to at least one embodiment. For example, Batch Deletion UI 736 is able to be used to delete files and directors in an efficient manner as described with reference to FIGS. 3-6. A list of file names is presented by Batch Deletion UI 736, wherein the latest files are listed first, and the dates associated with the files are extracted. A count of the files closest to a threshold value is determined, and based on the count, the number of files related to the count in an ascending order are deleted using Batch Deletion UI 736. The predetermined date is able to be increased iteratively until a count for files older than the days to retain and within the predetermined date is determined. Text manipulation is used to provide arguments for extracting files from the ordered list of file names. Directories are able to be deleted in response to determining all files in a directory are older than the predetermined date that is provided as an argument to the process. The predetermined date is equally applicable to the date of directory creation. Additional files or directories are able to be deleted by re-running the script in the background using the Batch Deletion UI 736. The file deletion process is accelerated compared to deleting files based on conditional checks. Operations of Batch Deletion UI 736 are able to be implemented using an Integrated Deletion Tool, API, Shell, etc. 738. Batch Deletion UI 736 uses a native command or flag with existing delete and remove commands. The user only has to provide the date as an argument. Scripts are not run on multiple servers, and java code or classes are not tweaked. No additional tool or software is used.

Processor 702 is also configured to receive information through I/O interface 710 to present Batch Deletion UI 736 on Display Device 730 that enables a user to execute the HDFS bulk deletion and to visualize information in support of the HDFS bulk deletion. In one or more embodiments, storage medium 704 stores computer program code 706 configured to cause processing circuitry 700 to perform at least a portion of the processes and/or methods for performing HDFS bulk deletion. In one or more embodiments, storage medium 704 also stores information, such as algorithm which facilitates performing at least a portion of the processes and/or methods for performing HDFS bulk deletion. Accordingly, in at least one embodiment, the processor circuitry 700 executes a method for performing HDFS bulk deletion. The process of performing HDFS bulk deletion includes generating a list of files in a Hadoop Distributed File System (HDFS) in order of an associated date of files in the HDFS, receiving a predetermined date for retaining selected files in the HDFS, identifying a count of files in the list with the associated date of the files in the HDFS older than the predetermined date, identifying files for deletion from the HDFS having the associated date older than the predetermined date, a number of the files identified for deletion being equal to the count of files, and deleting the number of the files in the HDFS identified for deletion equal to the count of files.

The method for performing HDFS bulk deletion according to at least one embodiment provides at least the advantages of determining files to delete based on a count number that increases the rate of deletion of such files compared to using conditional checks. Regular expressions are able to identify file names based on the name manipulation to remove spaces in the file names. An increase in the number of deletion jobs means more operations and receding deadlines, more availability and therefore more revenue with overall time savings. The deletion of older files and directories result in more efficient performance of datanodes and namenodes.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for performing bulk deletion of files in a Hadoop Distributed File System (HDFS), comprising:

identifying files across multiple distributed data nodes in an HDFS for inclusion in a list of files in the HDFS based on a first quantity of days indicating a retention period extending backward in time from a current date for the first quantity of days to a first cutoff date, and based on a second quantity of days indicating a lookback window extending backward in time from the current date for the second quantity of days to a second cutoff date older than the first cutoff date, wherein the lookback window defines a temporal range that extends beyond the retention period to capture additional files for potential deletion;

generating the list of files in the HDFS, the list of files comprising names of the files included in the list of files and creation dates of the files included in the list of files, wherein the files included in the list of files are sorted based on the creation date of each file in the list of files in order from oldest to newest in the list of files;

identifying a count of files in the list of files in the HDFS older than the first cutoff date and within the lookback window;

in response to identifying the count of files in the list of files older than the first cutoff date and within the lookback window is greater than zero, identifying a last occurrence of a closest date to the first cutoff date among the creation dates of the files in the list of files in the HDFS older than the first cutoff date and within the lookback window;

determining a deletion boundary by using the count of files in the list of files older than the first cutoff date and within the lookback window to identify a position in the sorted list of files corresponding to the count, wherein the deletion boundary separates files to be retained from files to be deleted without requiring individual date comparisons for each file;

identifying files in the list of files having the closest date as the creation date and older than the closest date based on the count of files in the list of files older than the first cutoff date and within the lookback window as files for deletion by selecting files from the sorted list up to the deletion boundary;

determining whether a file name associated with each of the identified files for deletion is to be manipulated based on a set of predefined conditions;

manipulating the file name associated with at least one of the identified files for deletion; and bulk deleting the files in the HDFS identified for deletion based on the manipulated file name associated with the at least one of the identified files for deletion.

2. The method of claim 1, further comprising:

in response to the count of files in the list older than the first cutoff date and within the lookback window being equal to zero, increasing the lookback window by receding the second cutoff date until the count of files in the list of files in the HDFS older than the first cutoff date and within the lookback window is greater than zero.

3. The method of claim 2, wherein increasing the lookback window by receding the second cutoff date until the count of files in the list of files in the HDFS older than the first cutoff date and within the lookback window is greater than zero is an iterative process by which the second cutoff date is moved backward in time by a predetermined quantity of days.

4. The method of claim 3, wherein the predetermined quantity of days is 30 or more.

5. The method of claim 4, wherein the predetermined quantity of days is 60 or more.

6. The method of claim 1, wherein manipulating the file name associated with the at least one of the identified files comprises:

manipulating text identifying the names of the files in the HDFS identified for deletion to generate manipulated file names having unwanted characters in the text removed.

7. The method of claim 1, wherein manipulating the file name associated with the at least one of the identified files further comprises:

passing the manipulated file names as arguments to deletion commands for deleting the files identified for deletion.

8. The method of claim 1, wherein manipulating the file name associated with the at least one of the identified files comprises:

identifying the at least one of the identified files for deletion having one or more predefined characters; and executing a command in association with the file name of the at least one of the identified files for deletion having the one or more predefined characters.

9. A device for performing bulk deletion of files in a Hadoop Distributed File System (HDFS), comprising:

a memory storing computer-readable instructions; and a processor connected to the memory, wherein the processor is configured to execute the computer-readable instructions to:

identify files across multiple distributed data nodes in an HDFS for inclusion in a list of files in the HDFS based on a first quantity of days indicating a retention period extending backward in time from a current date for the first quantity of days to a first cutoff date, and based on a second quantity of days indicating a lookback window extending backward in time from the current date for the second quantity of days to a second cutoff date older than the first cutoff date, wherein the lookback window defines a temporal range that extends beyond the retention period to capture additional files for potential deletion;

generate the list of files in the HDFS, the list of files comprising names of the files included in the list of files and creation dates of the files included in the list of files, wherein the files included in the list of files are sorted based on the creation date of each file in the list of files in order from oldest to newest in the list of files;

identify a count of files in the list of files in the HDFS older than the first cutoff date and within the lookback window;

in response to identifying the count of files in the list of files older than the first cutoff date and within the lookback window is greater than zero, identifying a last occurrence of a closest date to the first cutoff date among the creation dates of the files in the list of files in the HDFS older than the first cutoff date and within the lookback window;

determine a deletion boundary by using the count of files in the list of files older than the first cutoff date and within the lookback window to identify a position in the sorted list of files corresponding to the count, wherein the deletion boundary separates files to be retained from files to be deleted without requiring individual date comparisons for each file;

identify files in the list of files having the closest date as the creation date and older than the closest date based on the count of files in the list of files older than the first cutoff date and within the lookback window as files for deletion by selecting files from the sorted list up to the deletion boundary;

determine whether a file name associated with each of the identified files for deletion is to be manipulated based on a set of predefined conditions;

manipulate the file name associated with at least one of the identified files for deletion; and bulk delete the files in the HDFS identified for deletion based on the manipulated file name associated with the at least one of the identified files for deletion.

10. The device of claim 9, wherein, in response to the count of files in the list older than the first cutoff date and within the lookback window being equal to zero, the processor increases the lookback window by receding the second cutoff date until the count of files in the list of files in the HDFS older than the first cutoff date and within the lookback window is greater than zero.

11. The device of claim 9, wherein to manipulate the file name associated with the at least one of the identified files, the processor is further configured to manipulate text identifying the names of the files in the HDFS identified for deletion to generate manipulated file names having unwanted characters in the text removed.

12. The device of claim 11, wherein to manipulate the file name associated with the at least one of the identified files, the processor is further configured to pass the manipulated file names as arguments to deletion commands for deleting the files identified for deletion.

13. The device of claim 9, wherein the processor increases the lookback window by receding the second cutoff date until the count of files in the list of files in the HDFS older than the first cutoff date and within the lookback window is greater than zero by way of an iterative process by which the second cutoff date is moved backward in time by a predetermined quantity of days.

14. The device of claim 13, wherein the predetermined quantity of days is 30 or more.

15. A non-transitory computer-readable media having computer-readable instructions stored thereon, which when executed by a processor causes the processor to perform operations comprising:

identifying files across multiple distributed data nodes in an HDFS for inclusion in a list of files in the HDFS based on a first quantity of days indicating a retention period extending backward in time from a current date for the first quantity of days to a first cutoff date, and based on a second quantity of days indicating a lookback window extending backward in time from the current date for the second quantity of days to a second cutoff date older than the first cutoff date, wherein the lookback window defines a temporal range that extends beyond the retention period to capture additional files for potential deletion;

generating the list of files in the HDFS, the list of files comprising names of the files included in the list of files and creation dates of the files included in the list of files, wherein the files included in the list of files are sorted based on the creation date of each file in the list of files in order from oldest to newest in the list of files;

identifying a count of files in the list of files in the HDFS older than the first cutoff date and within the lookback window;

in response to identifying the count of files in the list of files older than the first cutoff date and within the lookback window is greater than zero, identifying a last occurrence of a closest date to the first cutoff date among the creation dates of the files in the list of files in the HDFS older than the first cutoff date and within the lookback window;

determining a deletion boundary by using the count of files in the list of files older than the first cutoff date and within the lookback window to identify a position in the sorted list of files corresponding to the count, wherein the deletion boundary separates files to be retained from files to be deleted without requiring individual date comparisons for each file;

identifying files in the list of files having the closest date as the creation date and older than the closest date based on the count of files in the list of files older than the first cutoff date and within the lookback window as files for deletion by selecting files from the sorted list up to the deletion boundary;

determining whether a file name associated with each of the identified files for deletion is to be manipulated based on a set of predefined conditions;

manipulating the file name associated with at least one of the identified files for deletion; and bulk deleting the files in the HDFS identified for deletion based on the manipulated file name associated with the at least one of the identified files for deletion.

16. The non-transitory computer-readable media of claim 15, wherein the operations further comprise:

in response to the count of files in the list older than the first cutoff date and within the lookback window being equal to zero, increasing the lookback window by receding the second cutoff date until the count of files in the list of files in the HDFS older than the first cutoff date and within the lookback window is greater than zero.

17. The non-transitory computer-readable media of claim 15, wherein manipulating the file name associated with the at least one of the identified files comprises:

manipulating text identifying the names of the files in the HDFS identified for deletion to generate manipulated file names having unwanted characters in the text removed.

18. The non-transitory computer-readable media of claim 15, wherein manipulating the file name associated with the at least one of the identified files further comprises:

passing the manipulated file names as arguments to deletion commands for deleting the files identified for deletion.

19. The non-transitory computer-readable media of claim 15, wherein increasing the lookback window by receding the second cutoff date until the count of files in the list of files in the HDFS older than the first cutoff date and within the lookback window is greater than zero is an iterative process by which the second cutoff date is moved backward in time by a predetermined quantity of days.

20. The non-transitory computer-readable media of claim 19, wherein the predetermined quantity of days is 30 or more.

21. The non-transitory computer-readable media of claim 20, wherein the predetermined quantity of days is 60 or more.

* * * * *